Sept. 8, 1953
L. L. CUMMINGS
2,651,319
GAS LIFT VALVE
Filed July 18, 1949
3 Sheets-Sheet 1
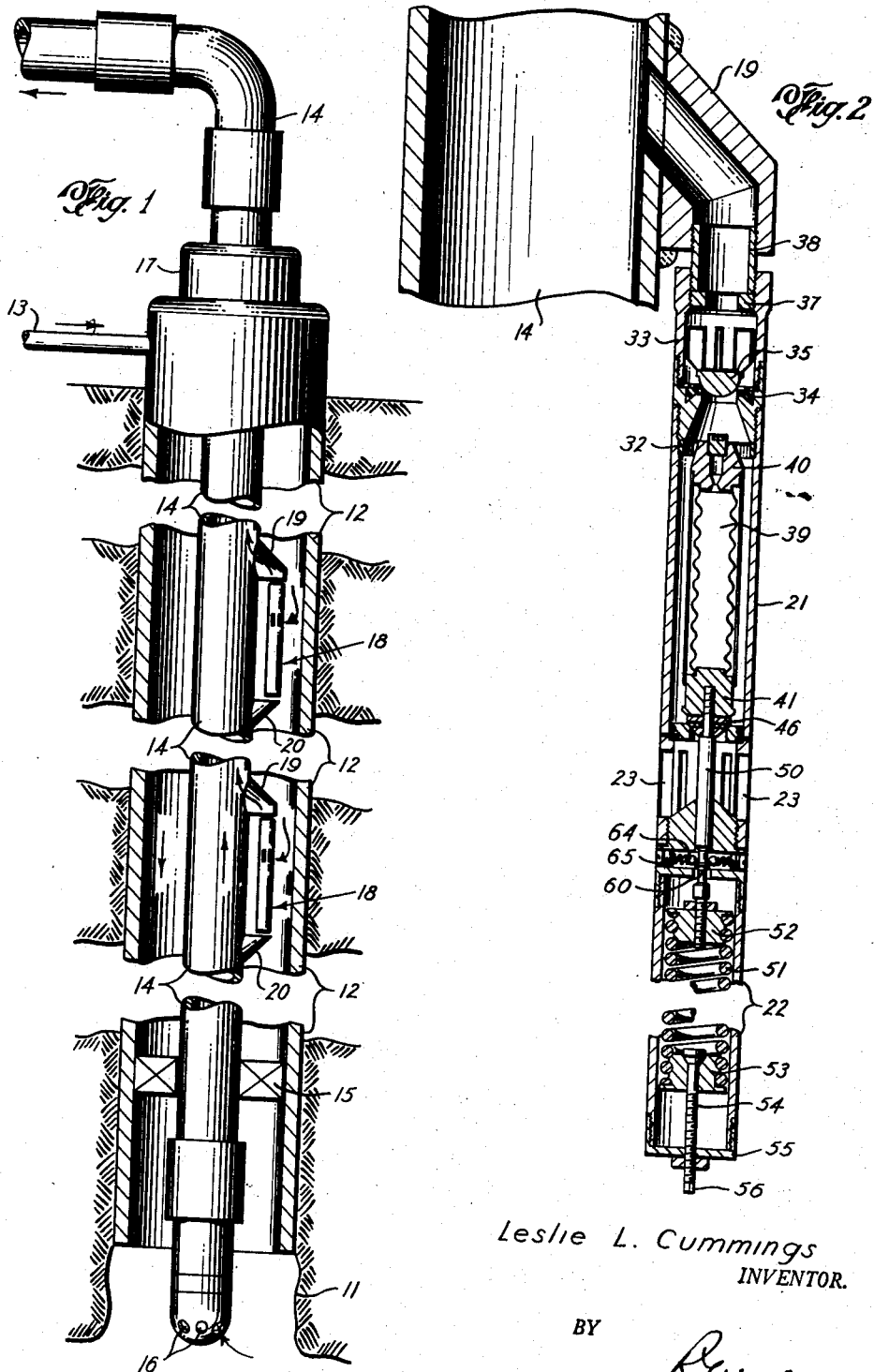
Leslie L. Cummings
INVENTOR.
BY
ATTORNEY Sept. 8, 1953
L. L. CUMMINGS
2,651,319
GAS LIFT VALVE
Filed July 18, 1949
3 Sheets-Sheet 2
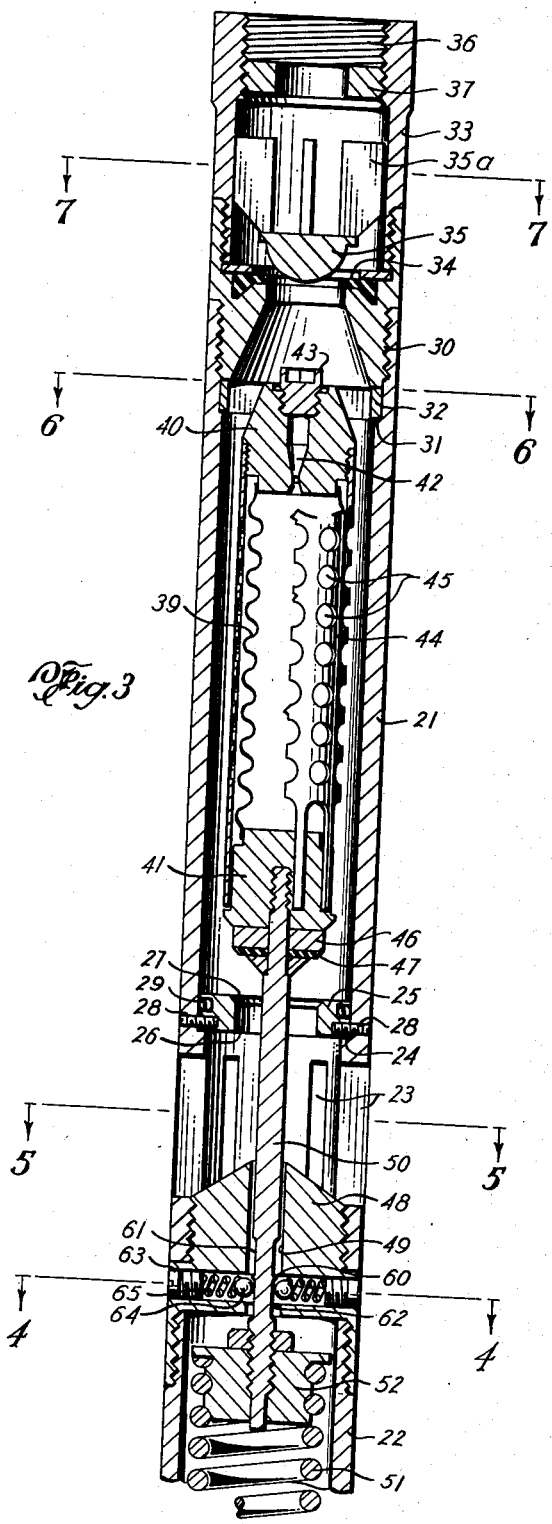
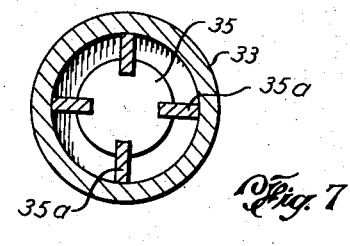
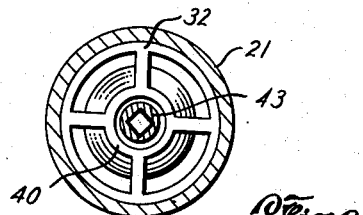
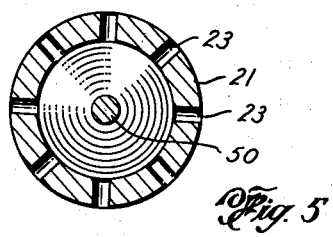
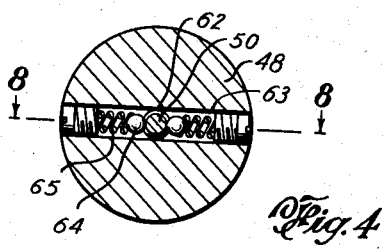
Leslie L. Cummings
INVENTOR.
BY
ATTORNEY Sept. 8, 1953 L. L. CUMMINGS 2,651,319
GAS LIFT VALVE
Filed July 18, 1949 3 Sheets-Sheet 3

Leslie L. Cummings
INVENTOR.

BY

ATTORNEY

Patented Sept. 8, 1953

2,651,319

UNITED STATES PATENT OFFICE 2,651,319

GAS LIFT VALVE

Leslie L. Cummings, Houston, Tex., assignor to Cummings, Inc., Houston, Tex., a corporation of Texas Application July 18, 1949, Serial No. 105,279

9 Claims. (Cl. 137—155)

This invention relates to well flowing apparatus and more particularly to a valve means for controlling the admission of gas or air under pressure into a column of fluid to raise the fluid out of the well.

Air or gas lift valves commonly employed for admitting lifting gas under pressure into a fluid column to be raised from the well, conventionally comprise a structure having a valved port for controlling the admission of the gas. The valve will normally be loaded to some predetermined pressure in a suitable manner, as by a pressure loaded flexible bellows type diaphragm or compression springs, or both, to maintain the valve in closed position until the pressure of the lifting gas exceeds the pre-set pressure of the valve.

Such valves are subject to a number of variables which affect the operation, including the hydrostatic head of the fluid column to be lifted, the weight of the lifting gas column, and the effect of temperature on the valve parts. Since gas lift valves are normally installed in a series along a tubing string through which the fluid is to be lifted, these variables may affect the valve in such manner as to make it difficult to determine which valve in the series is operating at any particular time, and in many instances may cause a higher gas-fluid ratio than is necessary to efficiently lift the fluid, thereby causing unnecessary wastage of lifting gas.

The valve in accordance with the present invention has for its principal object the provision of a novel valve structure which will obviate difficulties of the type enumerated and provide a valve which will operate efficiently despite variations of the kind mentioned.

An important object is to provide a valve structure employing improved means for loading the valve to a pre-set pressure which will not be subject to variations due to changes in tubing pressure, temperature and gas column weight.

Another object is to provide a valve which will open and close by snap action, and in which the opening and closing movements will be limited in extent and responsive to a narrow pressure differential relative to the pre-set pressure of the valve.

A more specific object is the provision of a valve which is loaded by a combination of a bellows type diaphragm and a coil spring in tension.

Another object is the provision of a mechanical gripping mechanism for restraining the opening and closing movements of the valve for operation within a pre-determined range of pressures above and below the pre-set pressure of the valve.

Additional objects and advantages will become apparent from the following detailed description when read in conjunction with the accompanying drawings which illustrate several useful embodiments in accordance with this invention.

In the drawings:

Fig. 1 is a more or less schematic view of a well showing the valve means in accordance with this invention installed on the flow tubing;

Fig. 2 is a longitudinal sectional view of one of the valve means, showing the parts thereof in their respective positions when the valve is closed;

Fig. 3 is a somewhat enlarged view generally similar to Fig. 2 showing the valve in the open position;

Figure 9:
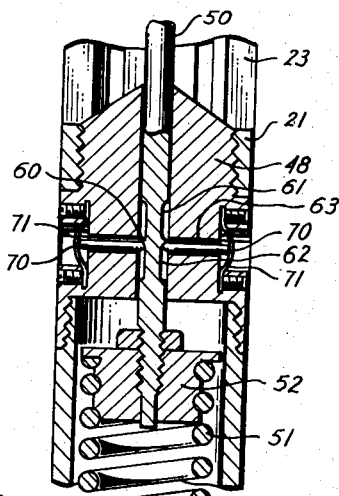
Figure 10:
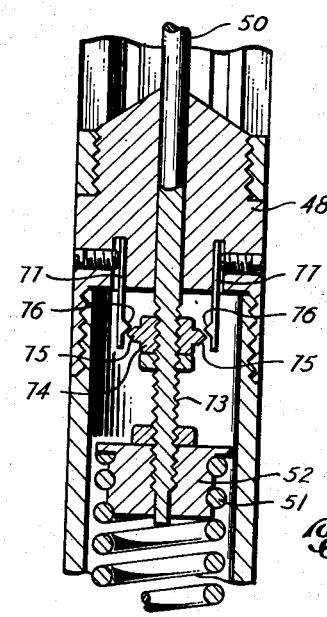
Figure 8:
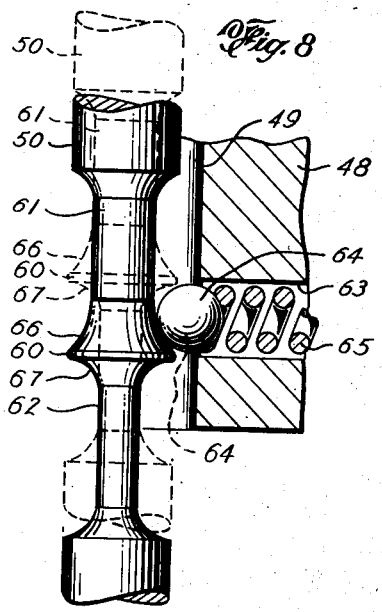
Figure 11:
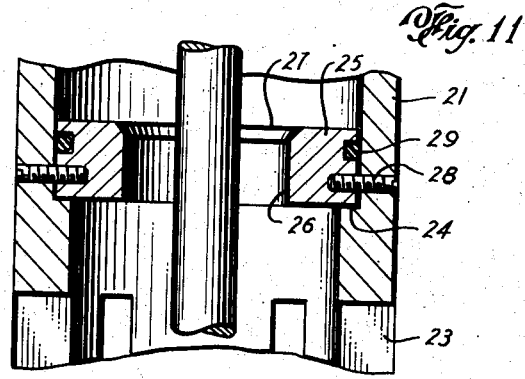

Figs. 4, 5, 6 and 7 are cross-sections taken respectively along lines 4—4, 5—5, 6—6 and 7—7 of Fig. 3;

Fig. 8 is an enlarged fragmentary view in longitudinal section taken generally along line 8—8 of Fig. 4 showing the details of a mechanical gripping mechanism employed to restrain the opening and closing movements of the valve illustrated in Figs. 1 and 2;

Figs. 9 and 10 illustrate two additional embodiments of the mechanical gripping mechanism; and Fig. 11 is an enlarged fragmentary view of the valve seat.

Referring to the drawings and Fig. 1 in particular, there is shown a well 11 lined with the usual metal casing 12 having an inlet pipe 13 connected to its upper end. A conventional string of tubing 14 extends through the bore of casing 12 and a conventional packer element 15 is installed between the tubing and casing above the producing horizon of the well to form a fluid-tight seal in the annular space between the tubing and casing to direct the well fluid into the lower end of the tubing through openings 16 provided therein for this purpose. The tubing passes through a conventional casing head 17 adapted to form a fluid-tight seal between the tubing and casing above inlet pipe 13. The upper end of tubing 14 leads to any suitable tank or other receptacle (not shown) for the fluid discharged from the tubing. Valve means, in accordance with this invention, indicated generally by the numerals 18, are installed along the exterior of the tubing in a more or less conventional series arrangement for admitting lifting gas to the interior of the tubing serially at spaced points therealong. Each of the valve means 18 is connected at its upper end to a nozzle 19 which communicates with the interior of the tubing and lugs 20 are positioned on the tubing to support the lower ends of the respective valve means.

Referring now to Figs. 2 and 3, each of the valve means 18 includes a tubular casing composed of an upper section 21 and a lower section 22. Upper section 21 is provided adjacent its lower end with a plurality of radial slots 23 through which gas or other fluid may be admitted to the interior of the casing. Section 21 is provided with an internal shoulder 24 located just above slots 23 on which is mounted a removable annular seat ring 25 (see Fig. 11) having a central port 26, the upper edge of which is upwardly and outwardly tapered to form a valve seating surface 27. Seat ring 25 is held in place on shoulder 24 by means of suitable set screws 28 extending through the wall of section 21 and may be removed to permit replacement of the seat ring in the event it becomes worn in service. A seal ring 29, such as a conventional O-ring, is installed in the periphery of the seat ring 25 above set screws 28 to form a fluid-tight seal between the exterior of the seat ring and the wall of section 21.

The upper end of upper section 21 is internally threaded at 30 and is provided with a second internal shoulder 31 below threads 30 for supporting a spider 32. A valve cage 33 is screwed into the upper end of section 21 above spider 32 and contains a generally conventional annular valve seat 34 and a gravity operated check valve 35, provided with radial guide wings 35a, mounted above seat 34 to close the latter against passage of fluid downwardly therethrough. The upper end of cage 33 is internally threaded at 36 for the reception of a choke bushing 37 and one end of a threaded nipple 38, the opposite end of which is adapted to be screwed into the outer end of nozzle 19 to establish communication between the valve means and the interior of tubing 14. A flexible tubular bellows 39 of generally conventional form, is mounted in the bore of upper section 21, the ends of the bellows being closed by upper and lower bellows adapters 40 and 41, respectively, to form a closed chamber within the bellows for confining a pressure fluid under suitable pressure. Upper bellows adapter 40 is provided with an axial passageway 42 through which the pressure fluid may be introduced into the interior of the bellows and passageway 42 is closed by a threaded plug 43. The upper adapter is fixedly connected to the center of spider 32, leaving the lower end of the bellows free to move axially of the casing in response to expansion and contraction of the bellows. A tubular guide 44 surrounds bellows 39 and has its upper end fastened to upper adapter 40. Its lower end surrounds lower adapter 41 and is slidable thereover so as to permit movement of the bellows relative to the guide. Guide 44 is provided with a plurality of openings 45 for discharge of fluid or detritus which may be trapped between the guide and the convolutions of the bellows. Lower bellows adapter 41 carries a valve disk 46 adapted to cooperate with seat 27 for opening and closing port 26. The lower face of valve disk 46 may be faced with a sealing disk 47 constructed of rubber or other resilient material to form a fluid-tight seal with seat 27 while preventing metal-to-metal contact between the valve and seat. The effective cross-sectional areas of port 26 and of the bellows are preferably made substantially equal for purposes to be described hereinafter, although other dimensional relationships for these parts may be employed without detracting from the other useful and important functions of the valve means.

Upper section 21 of the valve casing is connected to lower section 22 by means of a solid connector bushing 48 which is interposed between these sections and has its opposite ends threadedly connected thereto. Bushing 48 has an axial bore 49 for slidably guiding therethrough a cylindrical valve stem 50, the upper end of which is rigidly connected to the centers of valve disk 46 and lower bellows adapter 41. A coil spring 51 is mounted in the bore of lower section 22 and has its opposite ends connected to upper and lower bushings 52 and 53, respectively, which are slidable in the bore of section 22. The lower end of stem 50 is rigidly connected to upper spring bushing 52, and lower spring bushing 53 has a threaded adjusting bolt 54 connected thereto and screwed through the center of a cap 55 closing the lower end of section 22. The outer end of bolt 54 is squared at 56 for application of a wrench or other tool which may be employed to turn the bolt. By suitable adjustment of bolt 54, tension is applied to coil spring 51 and thence to stem 50 to thereby normally urge valve disk downwardly onto seat 27 by the tension in the coil spring.

By means of the described connection between spring 51 and bellows 39, it will be evident that valve 46 will normally be urged to the closed position on seat 27 by a combination of expansive pressure of the bellows and the tensional force exerted by spring 51. Any desired combination of these forces may be employed to pre-set the valve to a desired anti-opening pressure. Bellows 39 may be loaded at atmospheric or super-atmospheric pressure, or may even be evacuated to a sub-atmospheric pressure, and the tension on spring 51 in each case may be correspondingly adjusted to provide a total valve-closing force of the desired magnitude. For example, if it is desired to load the valve to maintain it closed to a pressure of, say, 500 pounds per square inch, the bellows may be loaded to 250 pounds per square inch and spring 51 will then be adjusted to apply a tensional force of 250 pounds per square inch. Obviously, other combinations of the bellows and spring loadings may be employed to provide the total desired loading of 500 pounds per square inch.

The length of stem 50 is dimensioned so that the distance between the upper face of spring bushing 52 and the lower face of connector bushing 48 will limit the upward movement of the stem and, therefore, the length of travel of valve disk 46 relative to seat 27, to whatever length of travel may be desired to obtain full opening of port 26. This limitation of the axial movement of the valve also serves to prevent undue contraction of the bellows under the opening force of the lifting gas.

In employing gas lift valves of the type described, it is desirable that the valve open and close with a snap action, that is, when opened, the valve should move quickly from its fully closed to its fully open position, so that the lifting gas may be admitted to the fluid column in the tubing in puffs or jets of substantial volume. Similarly, the valve should return from its fully open position to the fully closed position in a single quick movement following the admission of gas and consequent reduction in its pressure.

The desired snap action is imparted to the valve herein described by applying a suitable limited restraining force, as by means of a mechanical clutch or gripping element, preferably applied to stem 50, which is adapted to restrain the valve against opening until the gas pressure applied to open the valve exceeds the pre-established setting pressure of the valve, as determined by the spring and bellows loading, by some pre-determined increment; and which then functions to hold the valve open until the pressure of the lifting gas has been decreased below the pre-established setting pressure of the valve by a small pre-determined amount.

One embodiment of such a mechanical restraining or gripping means is illustrated in Figs. 2, 3 and 4 and in enlarged detail in Fig. 8. In accordance with this embodiment, the portion of stem 50 which extends through connector bushing 48 is provided with a peripheral double-faced cam member 60, which may be formed by cutting away the portion of the stem above and below the cam member providing upper and lower grooves 61 and 62, respectively. The upper and lower surfaces 66 and 67, respectively, of the cam member are machined or cut at an angle or on a curved radius to provide clutching or gripping surfaces. A cylindrical passageway 63 is bored diametrically through connector bushing 48 intersecting axial passageway 49. A pair of balls 64 are mounted in the opposite ends of passageway 63 and are pressed by means of coil springs 65 against the grooved portion of stem 50, the balls 64 entering either groove 61 or 62 depending upon the axial position of the stem. When the valve is in the closed position (Fig. 2 and solid lines Fig. 8) cam member 60 will be so positioned that the balls 64 will extend into upper groove 61 under the urging of springs 65 and will ride against the tapered upper surface 66. In order for the valve stem to move upwardly to allow the valve to open, cam member 60 must move upwardly past balls 64, this movement being resisted by the radial pressure exerted by springs 65 and the frictional forces developed thereby between balls 64 and upper cam surface 66. When this movement has occurred, balls 64 will drop into lower grooves 62 (Figs. 3 and broken lines Fig. 8). Thereupon, in order for the valve to close, a downwardly directed force must be exerted on the valve stem sufficient to overcome the compressional and frictional forces which will now be exerted between the balls 64 and lower cam surface 67. The latter will be tapered somewhat more steeply than upper flange surface 66, or cut on a smaller radius (see Fig. 8 particularly), so that somewhat greater force must be exerted in closing the valve than is necessary to open the valve. The shaping of surfaces 66 and 67 will be designed in relation to the radius of balls 64 and to the strength of springs 65 to provide a suitable pre-determined range of pressures extending above and below the pre-set pressure of the valve. This may be accomplished in various ways, which will be readily apparent to those skilled in the mechanical arts. For example, in the embodiment illustrated in Figs. 2, 3, 4 and 8, upper surface 66 may be tapered at an angle or curved to a radius so as to allow balls 64 to slip over the outer periphery of cam member 60 under an upwardly exerted pressure of, say, 10 pounds per square inch, and lower surface 67 may be tapered at a relatively steeper angle or smaller radius of curvature to allow balls 64 to slip over the periphery of cam member 60 at a downwardly exerted pressure of say, 20 pounds per square inch. Thus if the valve has been pre-set to operate at, say, 500 pounds per square inch, the valve will not open until the pressure of the lifting gas entering slots 23 from the casing has increased by an increment of 10 pounds per square inch, attaining a pressure of 510 pounds per square inch. When this 10 pound increase has been attained, the forces exerted between balls 64 and upper surface 66 will be overcome, allowing cam member 60 to move upwardly past balls 64 and thereby cause the valve to open with a snap to its fully open position. When the valve has thus opened, balls 64 will now be in lower groove 62 beneath cam member 60 (broken lines Fig. 8) and will prevent downward movement of the valve stem until the pressure of the gas has dropped by at least 20 pounds per square inch, that is, to a pressure of 490 pounds per square inch, thereupon overcoming the resisting forces exerted between balls 64 and lower surface 67 and causing the valve to thereupon close suddenly, cam member 60 moving downwardly relative to balls 64 which will then return to their initial position in upper groove 61. With this arrangement, the valve will be caused to move between the fully opened and fully closed positions without assuming any intermediate positions, which are undesirable in the operation of valves of the type with which this invention is concerned. It will be understood that the gripping elements may be designed for operation at other ranges of pressures than those given in the above example.

The above-described valve operates as follows: With the valve in the closed position, illustrated in Fig. 2, check valve 35 will be closed under the head of the column of fluid in tubing 14. The gas pressure will then be built up in the annular space between casing 12 and tubing 14 to a pressure exceeding the head of fluid in tubing 14 by the introduction of gas through pipe 13, which may be controlled by any suitable and conventional intermitter or other suitable control device adapted to control the flow of gas into the casing at proper intervals. When the pressure of the gas has been increased above the setting pressure of the valve by an amount sufficient to overcome the resistance of the mechanical restraining elements, previously described, valve disk 46 will snap open to its fully open position (Fig. 3), and a volume of gas will flow through slots 23 and port 26 into the interior of section 21 surrounding the bellows and thence through port 34, lifting check valve 35 and passing upwardly through choke 37 into tubing 14 through nozzle 19. The admission of gas into the tubing serves to lift some of the fluid therein to the surface, at the same time reducing the gas pressure in the casing. Gas will continue to flow into the tubing from the casing until the pressure in the latter has dropped sufficiently below the pre-set pressure of the valve to actuate the gripping elements and cause the valve to snap shut, as previously described. The gas pressure in the casing is then restored to its previous level, either automatically or manually and the operations for admitting and cutting off the flow of gas to tubing 14 will be repeated.

By making the effective cross-sectional areas of port 26 and of bellows 39 substantially equal, the valve may be made to operate independently of the back-pressure effect of the column of fluid

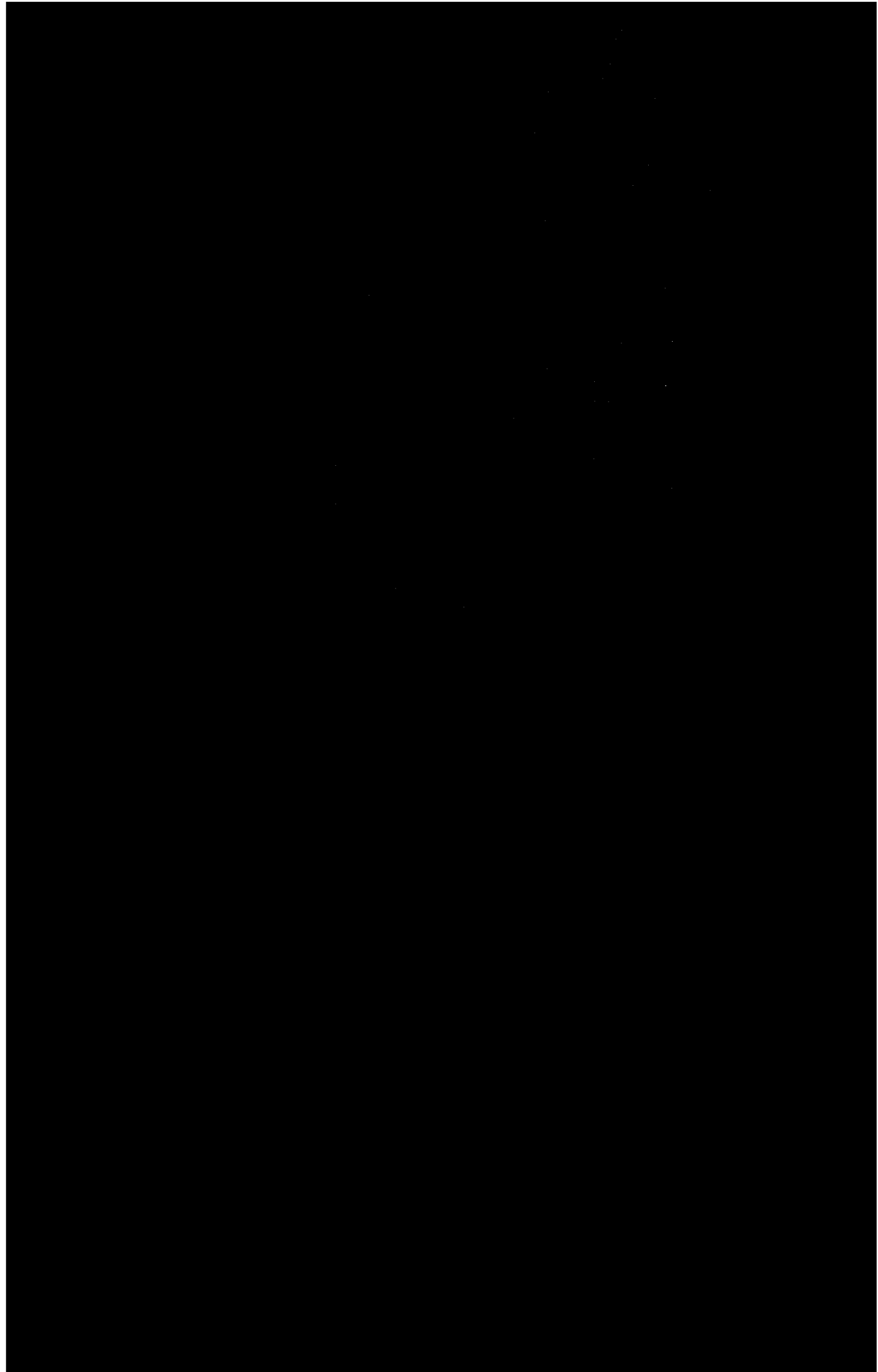

ing directions, said clutch means being designed to require a lesser force for release in the valve-opening direction than in the valve closing direction.

4. A valve according to claim 3 wherein said clutch means comprises a cam element having upper and lower oppositely sloping cam surfaces, and a thrust member in resilient contact with said surfaces, said surfaces being relatively differently shaped to provide greater resistance to downward movement of said stem than to upward movement thereof.

5. In a valve of the character described, a hollow casing having openings intermediate the ends thereof, an annular valve seat in said casing above said openings, a valve stem extending through said seat, a valve element mounted on said stem above said seat, a flexible resilient bellows member connected to said stem above said seat for applying compressional closing force to said valve element, a coil spring connected to said stem below said seat for applying tensional closing force to said valve element, both said forces being thereby combined to exert a pre-determined closing pressure on said valve element, and clutch means engaged with said stem and operative at pre-determined pressures above and below said closing pressure to release said stem for movement respectively in the valve-opening and closing directions.

6. In a valve of the character described, a hollow casing having openings intermediate the ends thereof, an annular valve seat in said casing above said openings, a valve stem extending through said seat, a valve element mounted on said stem above said seat, a flexible resilient bellows member connected to said stem above said seat for applying compressional closing force to said valve element, a coil spring connected to said stem below said seat for applying tensional closing force to said valve element, both said forces being thereby combined to exert a pre-determined closing pressure on said valve element, and clutch means engaged with said stem and operative at pressures above and below said closing pressure to release said stem for movement respectively in the valve-opening and closing directions, the engaging surfaces of said clutch means being shaped to require a lesser force for affecting release in the valve-opening direction than in the valve-closing direction.

7. In a valve of the character described, a hollow casing having openings intermediate the ends thereof, an annular valve seat in said casing above said openings, a valve stem extending through said seat, a valve element mounted on said stem above said seat, a flexible resilient bellows member connected to said stem above said seat for applying compressional closing force to said valve element, a coil spring connected to said stem below said seat for applying tensional closing force to said valve element, both said forces being thereby combined to exert a pre-determined closing pressure on said valve element, and clutch means engaged with said stem and operative at pressures above and below said closing pressure to release said stem for movement respectively in the valve-opening and closing directions, said clutch means comprising a cam element having upper and lower cam surfaces, and a thrust member in resilient contact with said surfaces, said surfaces being relatively differently shaped to provide greater resistance to downward movement of said stem than to upward movement thereof.

8. In a valve of the character described, a hollow casing having openings intermediate the ends thereof, a valve seat having an axial port therein mounted in said casing above said openings, a valve stem extending through said port, a valve element mounted on said stem above said seat, a tubular flexible resilient bellows member connected to said stem above said seat for applying compressional closing force to said valve element, a coil spring connected to said stem below said seat for applying tensional closing force to said valve element, both said forces being thereby combined to exert a pre-determined closing pressure on said valve element, the effective cross-sectional areas of said bellows member and said port being substantially equal, and clutch means engaged with said stem and operative at pre-determined pressures above and below said closing pressure to release said stem for movement respectively in the valve-opening and closing directions.

9. In a valve of the character described, a hollow casing having openings intermediate the ends thereof, an annular valve seat in said casing above said openings, a valve stem extending through said seat, a valve element mounted on said stem above said seat, a flexible resilient bellows member connected to said stem above said seat for applying compressional closing force to said valve element, a coil spring connected to said stem below said seat for applying tensional closing force to said valve element, both said forces being thereby combined to exert a pre-determined closing pressure on said valve element, means for adjusting the tension of said coil spring, and clutch means engaged with said stem and operative at pre-determined pressures above and below said closing pressure to release said stem for movement respectively in the valve-opening and closing directions.

LESLIE L. CUMMINGS.

References Cited in the file of this patent

UNITED STATES PATENTS

| Number | Name | Date |
| --- | --- | --- |
| 1,104,380 | Olechna | July 21, 1914 |
| 1,622,106 | Hallwood | Mar. 22, 1927 |
| 1,770,912 | Clapp | July 22, 1930 |
| 2,003,857 | Hale | June 4, 1935 |
| 2,236,158 | Rockefeller | Mar. 25, 1941 |
| 2,465,060 | Carlisle | Mar. 22, 1949 |
| 2,573,761 | Firth | Nov. 6, 1951 |

FOREIGN PATENTS

| Number | Country | Date |
| --- | --- | --- |
| 14,560 | Great Britain | of 1911 |